United States Patent
Fu et al.

(10) Patent No.: US 10,405,247 B2
(45) Date of Patent: *Sep. 3, 2019

(54) FORWARDING LEARNT STATE INFORMATION TO TARGET NODE AT MOBILITY

(71) Applicant: Huawei Technologies Co., Ltd., Shenzhen, Guangdong (CN)

(72) Inventors: Yusun Fu, Shanghai (CN); Johan Johansson, Stockholm (SE)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 14/456,569

(22) Filed: Aug. 11, 2014

(65) Prior Publication Data

US 2014/0348133 A1    Nov. 27, 2014

Related U.S. Application Data

(63) Continuation of application No. 12/497,976, filed on Jul. 6, 2009, now Pat. No. 8,838,105, which is a
(Continued)

(51) Int. Cl.
*H04W 36/00* (2009.01)
*H04W 76/28* (2018.01)
*H04W 72/12* (2009.01)

(52) U.S. Cl.
CPC ... *H04W 36/0083* (2013.01); *H04W 36/0055* (2013.01); *H04W 76/28* (2018.02); *H04W 72/12* (2013.01)

(58) Field of Classification Search
CPC ............. H04W 36/0083; H04W 76/28; H04W 36/0055
See application file for complete search history.

(56) References Cited

U.S. PATENT DOCUMENTS 6,519,469 B1 * 2/2003 Rydnell ................ H04W 72/12
370/349
6,745,032 B1 * 6/2004 Alvesalo ............... H04W 36/10
455/432.1
(Continued)

FOREIGN PATENT DOCUMENTS

CN    1879363 A    12/2006
EP    1519519 A1    3/2005
(Continued)

OTHER PUBLICATIONS

Phan et al., U.S. Appl. No. 60/831,858, filed Jul. 18, 2006.*
(Continued)

*Primary Examiner* — Brandon M Renner
*Assistant Examiner* — Jay L Vogel
(74) *Attorney, Agent, or Firm* — Leydig, Voit & Mayer, Ltd.

(57) ABSTRACT

A method for handover in a telecommunication system is disclosed. The method determines a traffic time pattern in a handover situation where a user equipment is handed over from a source cell to a target cell in the telecommunication system. History information relating to a traffic time pattern used in the source cell by the user equipment being handed over is forwarded from a controller node of said source cell to a controller node of said target cell. In the target cell, a traffic time pattern to be used by said user equipment in said target cell after the handover is estimated by taking into consideration at least said history information.

18 Claims, 7 Drawing Sheets

Related U.S. Application Data continuation of application No. PCT/CN2007/000038, filed on Jan. 8, 2007.

(56) References Cited

U.S. PATENT DOCUMENTS

| | | | |
|---|---|---|---|
| 6,819,937 | B2 | 11/2004 | Knuutila et al. |
| 6,950,656 | B1 | 9/2005 | Bahk et al. |
| 6,999,799 | B1 | 2/2006 | Almassy |
| 7,043,249 | B2 | 5/2006 | Sayeedi |
| 7,313,108 | B2 | 12/2007 | Scobbie |
| 7,408,901 | B1 * | 8/2008 | Narayanabhatla .... H04W 36/10 370/331 |
| 7,539,171 | B2 | 5/2009 | Sayeedi |
| 7,796,557 | B2 | 9/2010 | Xue et al. |
| 8,000,707 | B2 | 8/2011 | Dalsgaard et al. |
| 8,009,625 | B2 | 8/2011 | Padovani et al. |
| 2002/0051431 | A1 * | 5/2002 | Choi ................. H04W 36/0072 370/331 |
| 2002/0147010 | A1 * | 10/2002 | Cruz .................... H04W 68/12 455/426.1 |
| 2002/0172178 | A1 * | 11/2002 | Suzuki ............... H04W 76/068 370/338 |
| 2003/0142648 | A1 | 7/2003 | Semper et al. |
| 2004/0017792 | A1 * | 1/2004 | Khaleghi ........... H04W 76/046 370/335 |
| 2004/0148427 | A1 * | 7/2004 | Nakhjiri ............ H04W 36/0033 709/237 |
| 2004/0180675 | A1 * | 9/2004 | Choi .................. H04L 12/1877 455/458 |
| 2004/0248577 | A1 * | 12/2004 | Sayeedi ............. H04W 76/041 455/445 |
| 2005/0037759 | A1 | 2/2005 | Sipila et al. |
| 2006/0146753 | A1 | 7/2006 | Park et al. |
| 2006/0281461 | A1 * | 12/2006 | Kwun .................. H04W 28/18 455/436 |
| 2007/0037594 | A1 | 2/2007 | Palenius et al. |
| 2007/0081492 | A1 | 4/2007 | Petrovic et al. |
| 2007/0135080 | A1 | 6/2007 | Islam et al. |
| 2007/0218911 | A1 | 9/2007 | Islam et al. |
| 2007/0259673 | A1 | 11/2007 | Willars et al. |
| 2007/0281720 | A1 | 12/2007 | Lee |
| 2007/0291728 | A1 | 12/2007 | Dalsgaard et al. |
| 2008/0019320 | A1 * | 1/2008 | Phan ..................... H04W 36/02 370/331 |
| 2008/0043672 | A1 | 2/2008 | Sebire et al. |
| 2008/0049662 | A1 | 2/2008 | Islam et al. |
| 2008/0096557 | A1 | 4/2008 | Rinne et al. |
| 2008/0096563 | A1 | 4/2008 | Fischer et al. |
| 2008/0101268 | A1 | 5/2008 | Sammour et al. |
| 2008/0132225 | A1 | 6/2008 | Ranta et al. |
| 2008/0146231 | A1 | 6/2008 | Huang et al. |
| 2009/0185535 | A1 * | 7/2009 | Lee ..................... H04W 36/02 370/331 |
| 2010/0317344 | A1 | 12/2010 | Dalsgaard et al. |

FOREIGN PATENT DOCUMENTS

| | | |
|---|---|---|
| WO | WO 0120938 A1 | 3/2001 |
| WO | WO 0174095 A2 | 10/2001 |

OTHER PUBLICATIONS

3GPP TR 25.912 v7.1.0, 2006.*
Written Opinion of the International Searching Authority relating to Int'l Patent Application No. PCT/CN2007/000038 (Oct. 18, 2007).
1st Chinese Office Action of Chinese Application No. 200780001079.8 (Apr. 26, 2011).
2nd Chinese Office Action of Chinese Application No. 200780001079.8 (Sep. 7, 2011).
3rd Chinese Office Action of Chinese Application No. 200780001079.8 (Nov. 30, 2011).
Rejection Decision of Chinese Application No. 200780001079.8 (May 14, 2012).
"LTE States," 3GPP TSG-RAN WG2 Meeting #50, Sophia Antipolis, France, Tdoc R2-060021 (R3-060042), 3rd Generation Partnership Project, Valbonne, France (Jan. 9-13, 2006).
"DRX operations for connected mode UEs in LTE," 3GPP TSG-RAN2 Meeting #55; Seoul, Korea, Tdoc R2-062778; 3rd Generation Partnership Project, Valbonne, France (Oct. 9-13, 2006).
"Active mode DRX details," 3GPP TSG-RAN WG2 Meeting #56, Riga, Latvia, R2-063081, 3rd Generation Partnership Project, Valbonne, France (Nov. 6-10, 2006).
"3rd Generation Partnership Project; Technical Specification Group Radio Access Network; Requirements for Evolved UTRA (E-UTRA) and Evolved UTRAN (E-UTRAN) (Release 7)," 3GPP TR 25.913, V7.0.0, 3rd Generation Partnership Project, Valbonne, France (Jun. 2005).
"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)," 3GPP TS 36.300, V0.2.0, 3rd Generation Partnership Project, Valbonne, France (Nov. 2006).
Office Action in corresponding U.S. Appl. No. 12/497,976 (Feb. 19, 2013).
Office Action in corresponding U.S. Appl. No. 12/497,976 (Nov. 14, 2013).
Office Action in corresponding U.S. Appl. No. 12/497,976 (Jan. 9, 2012).
Final Office Action in corresponding U.S. Appl. No. 12/497,976 (Jul. 22, 2013).
Notice of Allowance in corresponding U.S. Appl. No. 12/497,976 (May 12, 2014).

* cited by examiner

FORWARDING LEARNT STATE INFORMATION TO TARGET NODE AT MOBILITY

CROSS-REFERENCE TO RELATED APPLICATION

This application is a continuation of U.S. patent application Ser. No. 12/497,976, filed on Jul. 6, 2009, which is a continuation of International Patent Application No. PCT/CN2007/000038, filed on Jan. 8, 2007, the contents of which are incorporated herein by reference in their entirety.

FIELD OF THE DISCLOSURE

The present disclosure relates to the field of telecommunications, and in particular, to a method, system and controller node for forwarding learnt state information to target node in a handover situation where a user equipment is handed over from a source cell to a target cell in a telecommunication system.

BACKGROUND OF THE DISCLOSURE

The present disclosure may be used in connection with essentially any wireless communication system. However, for pedagogical and exemplary reasons, the disclosure is hereafter described in relation to a $3^{rd}$ Generation Partnership Project (3GPP) Long Term Evolution (LTE) system.

First, a basic description of a 3GPP LTE system is given. As shown in FIG. 1, the architecture of 3GPP LTE is simplified compared to UTRAN release 6, by removing the central node controlling multiple Node Bs (RNC) and instead simply defining two nodes, E-UTRAN Node B (eNB) and access Gateways (aGWs), where the eNB belongs to the evolved UTRAN (E-UTRAN) and the aGW belongs to the evolved packet core network (EPC). As also shown in FIG. 1, there exists an X2 interface between the eNBs and an S1 interface between the eNB and aGW. This is described in reference document: 3GPP TS 36.300, v0.2.0, "Evolved Universal Terrestrial Radio Access (E-UTRAN) and Evolved Universal Terrestrial Radio Access Network (E-UTRAN) (Release 8)", 2006-11.

FIG. 2 shows the working assumption on the control plane (CP) architecture for the new LTE Radio protocol stack in 3GPP. The Radio Link Control (RLC) and Medium Access Control (MAC) protocols are terminated in the User Equipment (UE) and in the E-UTRAN Node B (eNB), while the header compression and security responsible protocol, named Packet Data Convergence Protocol (PDCP), are terminated in the UE and the access Gateway (aGW).

An intra E-UTRAN handover, where a UE is handed over from a source eNB to a target eNB, in an RRC_CONNECTED state (defined below) of a background art system, is a UE assisted network controlled handover, with handover preparation signaling in E-UTRAN. FIG. 3 shows a basic handover scenario where core network nodes do not change.

At a handover preparation procedure, context data is transferred from source eNB to target eNB. The context data, earlier discussed in 3GPP, is primarily related to the non-dynamic RRC (Radio Resource Control) configuration, i.e., the parameters that were received from the core network when radio bearers were setup and all the RRC configuration information (e.g., radio bearer and security RRC configuration).

The notation control channel is hereafter used in this document for control channels or control mechanisms of the wireless interface between the UE and the Node B, e.g., control channels or control mechanisms of the wireless Layer 1 or Layer 2. These control channels or control mechanisms control, for example, modulation and coding or retransmissions or reporting of frequently needed measurement data, such as channel quality or UL buffer status in the UE. Such a control channel may be a separate channel or multiplexed in-band with other channel(s) or information In 3GPP LTE, Non-Access Stratum (NAS) protocol states and state transitions are defined. There are three UE specific LTE states, which have been agreed in the standardization work and described in reference document: 3GPP TS 36.300, v0.2.0, "Evolved Universal Terrestrial Radio Access (E-UTRAN) and Evolved Universal Terrestrial Radio Access Network (E-UTRAN) (Release 8)", 2006-11. These three UE specific LTE states so far have been denoted as LTE_DETACHED, LTE_IDLE, and LTE_ACTIVE. The agreed LTE states capture the mobility management and are defined in the following way:

- LTE_DETACHED state: The location of the UE is not known by the network (e.g., the UE power is switched off).
- LTE_IDLE/RRC_IDLE state: The UE location is known on a tracking area in aGW. The UE can be paged and the UE registers to the network on tracking area change. UE performs cell reselection during mobility. The RAN/eNB does not maintain a UE context.
- LTE_ACTIVE/RRC_CONNECTED state: The UE location is known on a cell level. The network directs the UE to serving cells. The RAN/eNB does maintain a UE context.

Further, there is, in reference document: 3GPP TR 25.913, v7.0.0, "Requirements for Evolved UTRA (E-UTRA) and Evolved UTRAN (E-UTRAN) (Release 7)", 2005-06, requirements that include a "Dormant" MAC-substate within the LTE_Active state used for UE battery preservation and radio resource preservation. The MAC state is here denoted MAC_Dormant, to be distinguished from the active MAC state denoted MAC_Active. A LTE state model, including the MAC-Dormant state, is shown in FIG. 4. The main characteristics of the states within LTE_Active are:

- MAC_Dormant: Power and resource preservation may be achieved through discontinuous transmission and reception in the UE.
- MAC_Active: The UE is prepared for direct transmission (Uplink) and reception (Downlink).

The system described so far is still under discussion in the 3GPP standardization work. It is here given as an example of how a system may be implemented. Details in the system might be changed in the continuous future discussions during the standardization work, such as names of definitions for states or the like in the system. A skilled person, however, realizes that the present disclosure may be implemented in a system having such possible differences from the above described system, as well as in essentially any other wireless communication system.

LTE is a packet oriented system, in which packet arrivals are in general bursty and discontinuous so that battery saving from Discontinuous Reception (DRX) operation could be significant. It is also anticipated that UE will stay in the connected mode relatively long in a LTE system, so that efficient DRX operation for connected mode UE is important. FIG. 5 shows a DRX structure proposed in reference document: Samsung, R2-062778, "DRX operations for connected mode UEs in LTE", 2006-10, where "Active Period" is the period during which a UE's transmitter/receiver is turned on, "Sleep Period" is the period during which a UE's transmitter/receiver is turned off and "DRX cycle length" is the time distance between consecutive active period start positions. The DRX related parameter configuration could depend on the LTE states, service characteristics, radio environment, UE capability, or the like.

A timer in Node B could control the switch from MAC_Active to MAC Dormant. Alternatively, the switch could be based on a UE indication, such as a measurement, but then the timer would need to be transmitted to UE from the eNB. For even more fine-grained control, using multiple DRX cycle lengths in a MAC_Dormant state, multiple inactivity timers could be used. This has been proposed in the 3GPP standardization work. This solution is based on the assumption that activity is assumed higher during some period after a data burst for normal traffic patterns.

The DRX setting would then be determined by:
Configuration Information (RRC); and/or
Activity (or inactivity) history.

As the LTE system is a packet oriented system, switching from the LTE_Active to the LTE_Idle state could also be based on inactivity timers, rather than based on the setting up and release of connections.

An Uplink, from UE to eNB, in the LTE radio access interface is orthogonal, meaning that different uplink transmission resources are isolated from each other. Furthermore, the mechanism for resource isolation is such that allocation of a first resource implies that the available resources for other usage are decreased, even if the first resource is not used for an actual transmission. This means that it is a waste of resources to allocate dedicated transmission resources to a UE if the UE does not use these resources.

A normal condition for starting uplink data transmission for bulk data transfer in LTE is that a UE from the start does not have any dedicated uplink transmission resources. The UE then has to perform a "random access" procedure on a common contention channel, in order to be allocated an uplink transmission resource by the eNB, which owns the transmission resources. When being in data transmission phase, the UE can request more uplink resources by inband signaling, by indicating the need to send more data in a MAC header. The signaling, from UE to eNB, to request uplink resources by a random access procedure, and the signaling, from eNB to UE to grant certain uplink transmission resources can involve significant overhead. For low bandwidth media applications, such as video or voice, the overhead of the above mentioned uplink resource allocation procedures may be very significant, resulting in a problem relating to efficient usage of communication resources in the system.

This problem has been recognized in 3GPP and various approaches have been proposed to resolve this problem. Most proposals presented in 3GPP discussions involve some kind of "persistent" scheduling, meaning that the eNB does not allocate resources for every data burst, but instead determines an allocation of time-recurring resources needed for transmitting a stream of certain bandwidth. That is, in "persistent" scheduling resources for a number of following data bursts are allocated at once, which may lower the resource allocation signaling overhead. Further, in order to be able to utilize non-activity, e.g., for voice, the eNB could change, or remove, the resource allocation when inactivity has been detected.

For some IP Multimedia Subsystem (IMS) media applications, there is a possibility for the Core Network to send Quality of Service (QoS) related parameters to an eNB in the Radio Access Network (RAN), so the eNB can deduce from those parameters how this "persistent" resource allocation shall be configured to match the application needs. For instance, different application codecs might generate different sized data packets at different periodicity, etc. The Core Network may for IMS provide these parameters, since IMS uses standardized traffic procedures. The IMS Network can therefore easily from the IMS signaling extract the needed parameters and provide them to the eNB, using the Core Network.

However, for various Internet applications (other than IMS), there will in many cases be no such QoS information available, since the Core Network does not from the start know the characteristics of the received signals as this large amount of various Internet applications are not as strictly regulated as the IMS applications. The Core Network can therefore from the start of the application not inform the eNB how to configure the resource allocation of the communication. Furthermore, a radio interface ciphering that is terminated in the Core Network would make it difficult for the Radio Access Network or the Node B to quickly detect codec type, etc., based on peeking into the data stream.

In background art solutions of this problem, the eNB would then start by over-allocating uplink resources. Based on UE usage and on UE in-band requests for more resources or absence of such requests, the eNB could then eventually learn the codec behavior, i.e., it could eventually have learned the used Packet Data Unit (PDU) sizes, the packet periodicity and the activity behavior. This method, however, does not fully optimize the resource allocation and usage, since the eNB has to over-allocate resources during the time period of learning the codec behavior.

Also for IMS applications, the eNB is not always provided with all parameters needed. For instance, the eNB is not always provided with information regarding packet periodicity. Therefore, also for some cases relating to IMS application, a learning procedure has to be performed by the eNB, during which the resource allocation will be non-optimized.

There is thus a resource allocation problem present in the background art solutions, resulting from the fact that the eNBs do not have all the adequate information it needs for configuration of the resource allocation and therefore has to start by, during a time period, learning the behavior of the application codec. This may be especially troublesome in mobility scenarios, when a UE is moving in the system, since the UE then is handed over from eNB to eNB, and each of these eNBs has to carry out this learning procedure.

SUMMARY

The embodiments of the present disclosure provide a method, a telecommunication system, a source cell controller node and a target cell controller node that solve one or several of the above stated problems.

The method includes: forwarding, from a controller node of said source cell to a controller node of said target cell, history information relating to a traffic time pattern used in the source cell by the user equipment being handed over, and estimating, by taking into consideration at least said history information, a traffic time pattern to be used by said user equipment in said target cell after the handover.

The telecommunication system includes: means for forwarding, from a controller node of said source cell to a controller node of said target cell, history information relating to a traffic time pattern used in the source cell by the user equipment being handed over, and means for estimating, by taking into consideration at least said history information, a traffic time pattern to be used by said user equipment in said target cell after the handover.

The source cell controller node includes: means for forwarding, to a controller node of said target cell, history information relating to a traffic time pattern used in the source cell by the user equipment being handed over.

The target cell controller node includes: means for receiving, from a controller node of said source cell, history information relating to a traffic time pattern used in the source cell by the user equipment being handed over, and means for estimating, by taking into consideration at least said history information, a traffic time pattern to be used by said user equipment in said target cell after the handover.

The method, the telecommunication system, the source cell controller node and the target cell controller node according to the present disclosure are characterized in that history information relating to traffic behavior in the timeplane, i.e., a traffic time pattern, of the UE in the previous cell or cells is forwarded to a target cell controller node at handover.

This has the great advantage that it is possible for a target cell controller node to directly from the start allocate optimal resources for the UE. Thus, instead of spending calculation resources and periods of suboptimal resource allocation during a learning time, as was the case in background art solutions, the target cell controller node may, according to the present disclosure, allocate resources in an optimal manner during the whole communication with the UE.

In an embodiment of the present disclosure, the source cell controller node forwards history information relating to discontinuous reception (DRX), such as activity history or DRX configuration in the source cell, to the target cell controller node.

This has the advantage that it makes it possible for the target cell controller node to directly determine a suitable DRX configuration to use, thereby utilizing radio resources optimally and also preserving UE battery.

According to an embodiment of the present disclosure, the source cell controller node forwards activity information or inactivity information that may be used as basis for idle mode transition decisions to the target cell controller node.

This has the advantage that, when forwarding activity information or inactivity information, activity or inactivity patterns over longer time periods may be used as basis for the decisions, which improves the quality of these decisions. This has further the advantage that timer problems of high mobility UEs are reduced.

According to an embodiment of the present disclosure, the forwarded history information relating to traffic behavior in the timeplane is in the target cell used for configuration of scheduling in the target cell.

This has resource optimization advantages since the target cell controller node does not have to spend time learning the behavior of the UE being handed over, during which the controller node would have had to over-allocate resources to the UE.

Detailed exemplary embodiments and advantages of the method, the telecommunication system, the source cell controller node and the target cell controller node according to the disclosure will now be described with reference to the appended drawings illustrating some exemplary embodiments.

DETAILED DESCRIPTION

At handover, only configured RRC states or current protocol states are forwarded in the background art solutions. The Node B therefore has to spend a learning period to figure out a suitable resource allocation. During this learning period, the Node B does not have enough information to make an optimal resource allocation.

Figure 6:
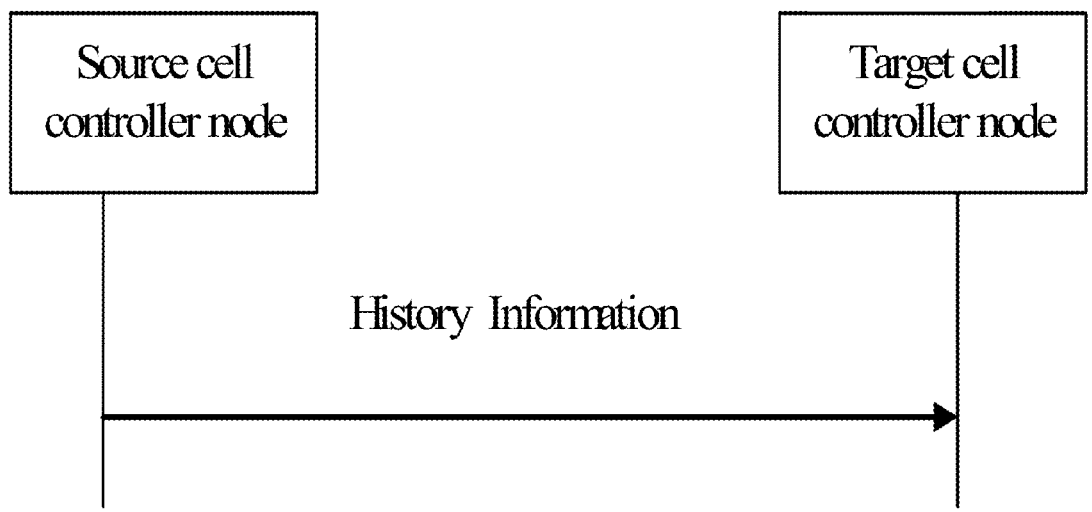
FIG. 6 shows a signaling scenario according to an embodiment of the present disclosure.

According to an embodiment of the present disclosure, learnt history information relating to a traffic behavior of the UE being handed over is proposed to be forwarded from a controller node of the source cell to a controller node of the target cell at handover, as shown in FIG. 6. The source cell controller node and target cell controller nodes may, for instance, be eNBs or another node in a communication system having a corresponding function as an eNB. The traffic behavior forwarded by this embodiment of the disclosure includes a traffic pattern in the timeplane of the UE being handed over. This traffic time pattern relates to a history of the UE in the previous cells it has been in, including information relating to how the UE has behaved in the timeplane in the source cell.

As this history information is forwarded to a node controlling the target cell, such as an eNB, the controller node of the target cell may, directly from the start, allocate optimal resources to the UE, instead of spending a long learning period before it has a chance to optimize the allocation. By performing this operation, significant improvements in resource allocation can be achieved. Learning period calculations does not have to be performed in the target cell controller node. But even more advantageous is that radio resources are more optimally used by the embodiments of the present disclosure. Radio resources are in all communication systems very important to use in an as optimized way as possible.

At or after a background art handover, target Node B does not further know the UE activity history needed to determine a suitable DRX configuration. This leads to higher battery consumption and possibly higher radio resource consumption than needed, as the Node B must first try a high-activity DRX setting also when a low activity UE is moving in the network. After a while, during which time the UE has been inactive in current Node B, the UE can be switched over to a low-activity DRX state. But until then, the UE has used more resources than necessary.

According to an embodiment of the present disclosure, Node B forwards an activity history or the current DRX configuration to target Node B at handover making it possible for the target Node B to set a suitable DRX configuration, preserving battery and using radio resource optimally; and during the whole time period, a UE is under the control of a Node B. A traffic pattern in the timeplane of the UE being handed over, related to an activity history or a used DRX configuration of the UE in the source cell, is thus forwarded in this embodiment of the disclosure.

Figure 1:
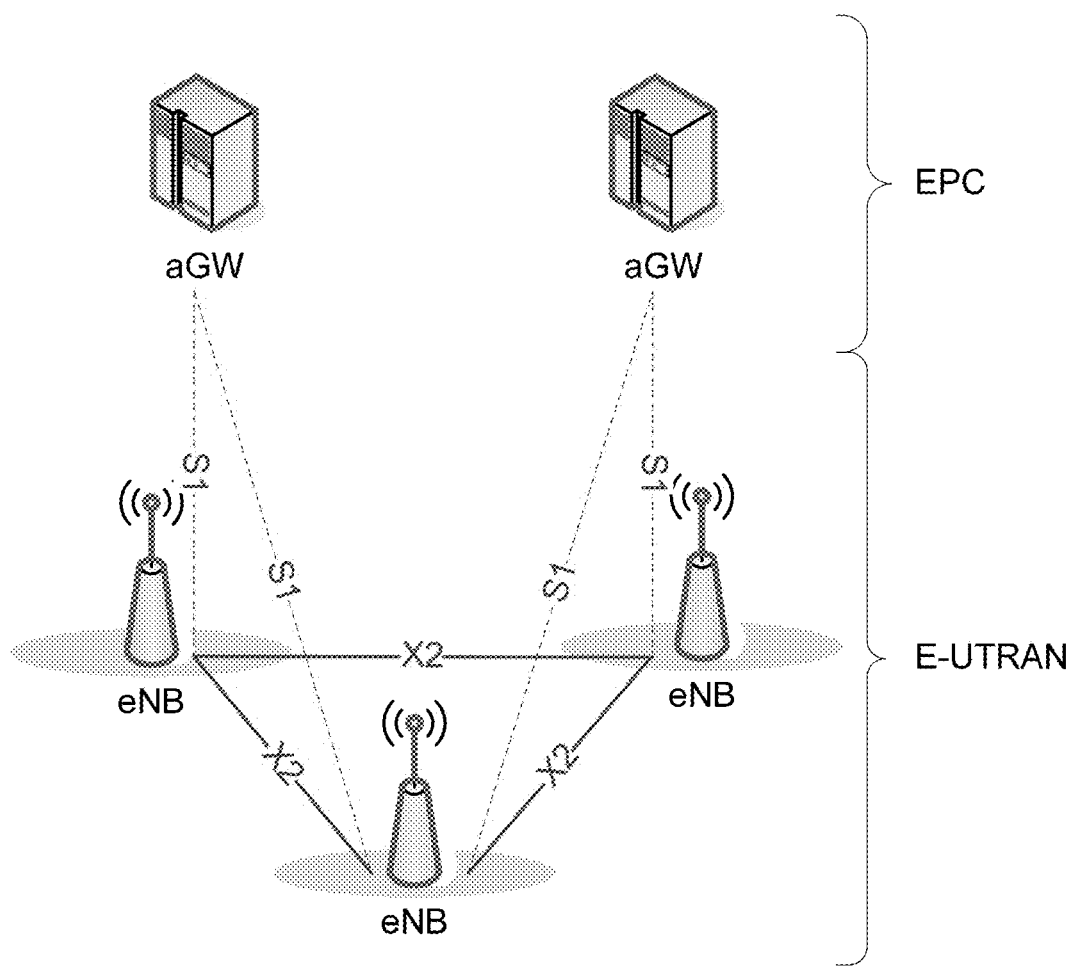
FIG. 1 shows the 3GPP LTE architecture.
Figure 2:
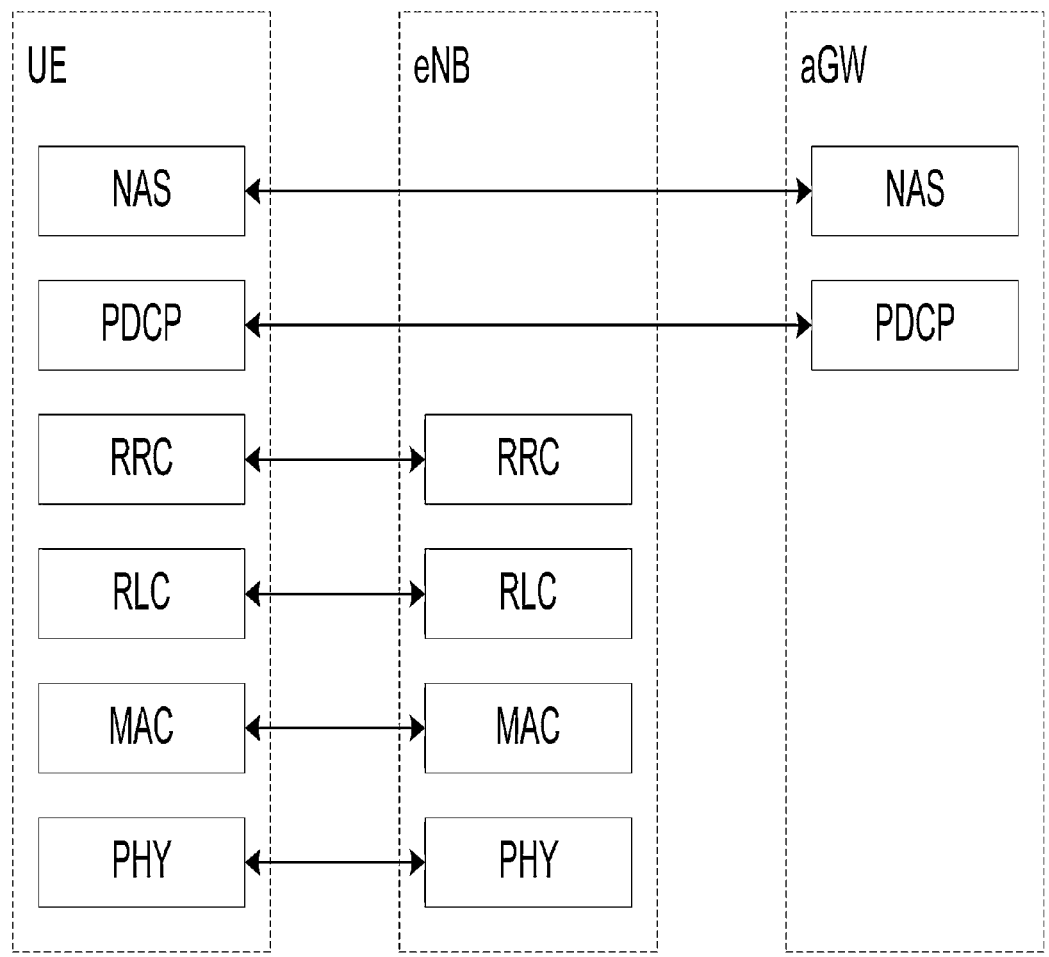
FIG. 2 shows a control plane architecture for the LTE radio protocol stack.

Signaling-wise, to not add additional signaling, this information may preferably be included in handover preparation, in the message that initiates a handover preparation procedure. This message is called HO Preparation Request in FIG. 3, and is sent by the X2 interface, as shown in FIG. 1.

The activity history information may, according to various embodiments of the present disclosure, include one or any combination of the following:

MAC_Dormant or MAC_Active state indicator, telling if DRX is active or not in the source system. This state is assumed to be decided based on activity/inactivity and could be regarded to be a coarse indication of recent activity history.

DRX cycle length. When using multiple DRX cycle lengths, based on activity/inactivity, this could be regarded to be an indication of activity history.

Timer counting up time since last data transmission in UL or DL.

Timer counting down inactivity time to state transition, where state transition could be Change of DRX cycle length (to longer DRX cycle) in MAC_Dormant, MAC_Active state to MAC_Dormant, or from LTE_Active to LTE_Idle.

Learnt Traffic pattern information, such as likelihood(s) that a data-burst is followed by another data-burst within certain time-window (s). This information could be used to determine when to start DRX and/or which DRX cycle time to apply within certain time windows after a data burst.

Another user activity problem in the background art solutions is the switching to the LTE_Idle state. It is assumed that this transition is also based on user inactivity. However, for LTE, the Active Mode DRX state is assumed to be quite efficient, which means that the Idle-transition timer could be quite long, e.g., 30 seconds. It is further assumed that modern networks will be optimized for low mobility and high capacity, which means that network deployments of many small cells, such as pico-cells, will be common. Thus a highly mobile UE might change cell so often that it moves to the next cell before the Idle state transition timer can time out in one cell, and further moves on to yet another cell and so on. This might then prolong the time the UE stays in LTE_active state, since no timers have time to run out, leading to higher battery consumption, possibly higher radio resource consumption and more mobility signaling load than needed, since Idle mode mobility involves less signaling than Active mode mobility.

In an embodiment of the present disclosure, a node in the source cell, such as source Node B, forwards the activity history or an inactivity history to a controller node of the target cell, such as target Node B, at handover. A traffic pattern in the timeplane of the UE being handed over, related to an activity history or an inactivity history of the UE in the source cell, is thus forwarded in this embodiment of the disclosure. The target Node B may then determine when to transition to Idle, based on activity or inactivity also in the source cell. This has the advantage that activity or inactivity information over a longer time period may be used as basis for the decision, which increases the quality of the decision. To forward activity or inactivity information may also mitigate the problem of UEs never reaching timer timeout due to high mobility of the UEs, i.e. that the UEs are moving fast in the network.

If target Node B does not receive the activity history from source Node B, as in background art, target Node B needs to assume full activity and restart new timers for setting of DRX, and transition to Idle, which could result in higher UE battery consumption, higher radio resource consumption and more mobility signaling, if staying in active instead of going to Idle. All these drawbacks are mitigated by the present disclosure.

In particular, to support transition from Active state to Idle state, and setting of Dormant State, activity history or inactivity history should be forwarded. The activity history or inactivity history may, according to various embodiments of the present disclosure, include one or any combination of the following:

MAC_Dormant or MAC_Active state indicator, telling if DRX is active or not in the source system. This state is assumed to be decided based on activity/inactivity and could be regarded to be a coarse indication of recent activity history.

DRX cycle length. When using multiple DRX cycle lengths, based on activity/inactivity, this could be regarded to be an indication of activity history.

Timer counting up time since last data transmission in UL or DL.

Timer counting down inactivity time to state transition, where state transition could be Change of DRX cycle length (to longer DRX cycle) in MAC_Dormant, MAC_Active state to MAC_Dormant, or from LTE_Active to LTE_Idle.

Learnt Traffic pattern information, such as likelihood(s) that a data-burst is followed by another data-burst within certain time-window (s). This information could be used to determine when to start DRX and/or which DRX cycle time to apply within certain time windows after a data burst.

Further, at or after handover for internet media applications, where the Node B/RAN is assumed to learn the codec behavior, a target Node B does not know the media application codec behavior. The target Node B might not even know that it is a media application. After the handover, the target Node B would have to learn this, during a learning period, from the observable characteristics of the media stream. During the learning period, it could be assumed that the radio resources are not well utilized. This is due to the fact that, in order to be able to allow learning of a parameter, for example a packet periodicity, the Node B needs to over-allocate radio resources. Also, during this learning period the signaling overhead will be significant as the possibility to use persistent scheduling is limited until the target Node B has better knowledge about the traffic characteristics.

Also, for media-like applications generating data in a regular traffic pattern, there are further potential signaling overhead reductions that can be done, that are difficult to apply to bursty data transfer applications, for example:

Transmission resources could be allocated a priori also for retransmissions based on retransmission probability.

Signaling of UE UL transmission buffer status or scheduling request could be compressed, e.g. giving particular meaning to particular bits, referring to resource allocations optimized for frequently used packet sizes in the data stream.

Signaling of channel quality measurements could be optimized for the transmission need.

Thus, for regular traffic patterns, less information need to be signaled explicitly over the wireless interface (as more information can be inferred implicitly), but the cell controller nodes can not apply such signaling optimizations unless the traffic pattern is known.

In an embodiment of the present disclosure, learned traffic pattern information is forwarded from a controller node of the source cell, such as a source cell Node B, to a controller node of the target cell, such as a target Node B, in order to avoid that a target Node B needs to relearn the traffic pattern from scratch, as it can be assumed that radio resources are used inefficiently during a learning phase, in particular for media applications such a voice or video. A traffic pattern in the timeplane of the UE being handed over, relating to scheduling used for the UE in the source cell, is thus forwarded in this embodiment of the disclosure.

Such a traffic pattern might be described by one or more of the following parameters: Type of data transfer, media stream or interactive data. These parameters may be combined, mixed, one added on top of the other, or separately used. One or any combination of the following parameters may thus be used for describing and forwarding a traffic pattern:

Current persistent scheduling configuration, if any available. The content of persistent scheduling configuration information is defined below, after this list.

Current configuration of control channels. The configuration of control channels might be optimized based on the characteristics of the traffic to reduce overhead.

Packet Inter-arrival times, irregular or regular, corresponding to e.g. codec packet periodicity. Possibly, there could be several inter-arrival times for one stream, e.g. corresponding to different levels of user activity, e.g. for AMR (Adaptive Multi-Rate) codecs that generate small infrequent silence frames at inactivity.

Initiating criteria for changing packet inter-arrival time. This could e.g. be reception of a packet larger than a certain size, reception of a packet smaller than a certain size, non-usage of allocated resource or an explicit UE scheduling request.

Packet sizes. Irregular or regular packet sizes as well as most common size(s) may be specified. Alternatively, one or several cumulative distribution(s) with a number of common packet sizes and the corresponding fraction of packets that could be carried in a resource of this size. In addition, packet sizes or a packet size distribution could be defined as belonging together with an inter-arrival pattern. For example, when the inter-arrival pattern changes, the packet-size distribution also changes and vice versa.

Initiating criteria for changing packet size(s) or packet size distribution. Such criteria may be: reception of a packet a certain size, larger than certain size or smaller than a certain size; non-usage of allocated resource or an explicit UE scheduling request.

Configuration information relating to persistent scheduling and also for normal "non-persistent" scheduling may include at least one of the following information:

Configuration of DL (Down Link) control and traffic channels, e.g. what radio resources the UE shall monitor and how to decode the information on those radio resources; how the UE is addressed etc. (such that the UE is able to receive commands from Node B) and when/how often the UE has to receive such information.

Information relating to what is being explicitly signaled on the control channels versus being implicitly inferred.

Recurring Radio Resources that the UE can use for UL (Up Link) data transmission, such as time-frequency resources, or possibly just time resources, since frequency might be allocated just in time.

Methods, encodings and radio resources that the UE can use for UL scheduling requests, such as:

Resources embedded with data, e.g. in MAC headers.

Using dedicated UL radio resources, e.g. recurring time-frequency resource and possibly also a dedicated code for CDMA, such as multiplexing of multiple UEs. These radio resources may further be shared, used also for e.g. recurring channel quality measurement reporting.

Using shared contention resources used for UL scheduling request.

Rules for when the UE is allowed to do explicit UL scheduling requests.

According to various embodiments of the disclosure, by forwarding a traffic time pattern from a source controller node to a target controller node, both optimized scheduling and signaling overhead reduction methods may be utilized direct from the start of the application. These signaling overhead reduction methods may include a prior allocation of retransmission resources, compression of signaling of buffer status and scheduling requests, and optimization of channel quality measurement signaling. To be able to have optimized scheduling from the start of an application and to be able reduce overhead is, of course, very advantageous in a radio resource point of view.

Further, various embodiments of this disclosure propose to forward learnt history information from source to target system at handover. Typically some (but not all) history or learnt information could be assumed to be preferably vendor-specific. For example, the MAC scheduler model of the traffic characteristics, which could be a statistical model of any kind, may be vendor-specific.

To allow forwarding of vendor-specific information between source and target systems at handover, part of (or all of) the learnt history information may according to an embodiment of the present disclosure be forwarded as one or more transparent protocol information elements. Thus, information elements may be forwarded by implementation of this embodiment of the disclosure.

This embodiment has the advantage that it allows vendor-specific optimizations, which might further optimize behavior at handover. It has further the advantage that, by using transparent protocol information elements, these information elements may be freely used and are not subject to presence rules and not subject to protocol semantics rules. Preferably, such information elements also have free syntax, i.e. could be regarded as transparent bit or byte containers.

Further, by using various embodiments of this disclosure, the target Node B could start DRX reception at once after a handover to save more power and resources after target Node B receives a handover confirm. However, the UE being handed over does not automatically know if the target Node B has received sufficient history information or not, and the UE does further not know if the source and the target Node B both work according to the same resource management algorithms and parameters. Thus, the UE cannot automatically assume that the DRX settings from the source system will be maintained in the target system, which may be a problem for the UE.

To solve this problem, the target Node B does, according to an embodiment of the present disclosure, explicitly send the DRX configuration to the UE or inform the UE that old settings or predefined settings shall be used in the target cell after handover has been completed. The DRX related configuration could include the following information:

DRX related parameters, such as DRX cycle lengths, measurement filtering coefficient, DRX cycle starting point and DRX inactivity timers for control of usage of DRX cycles and for deciding the state transition from MAC_Active state to MAC_Dormant.

MAC state indicator, for indicating MAC state/DRX cycle length to apply after handover completion.

Control channels, which need to be monitored by UE

Similarly, the scheduling configuration based on the learnt traffic pattern and/or the control channel configuration needs to be signaled from the target Node B to the UE. Similarly, the persistent scheduling configuration, if used, need to be signaled from the target Node B to the UE. Further, the derived traffic pattern may also be based on QoS parameters or on a combination of QoS parameters and learnt traffic pattern.

Figure 3:
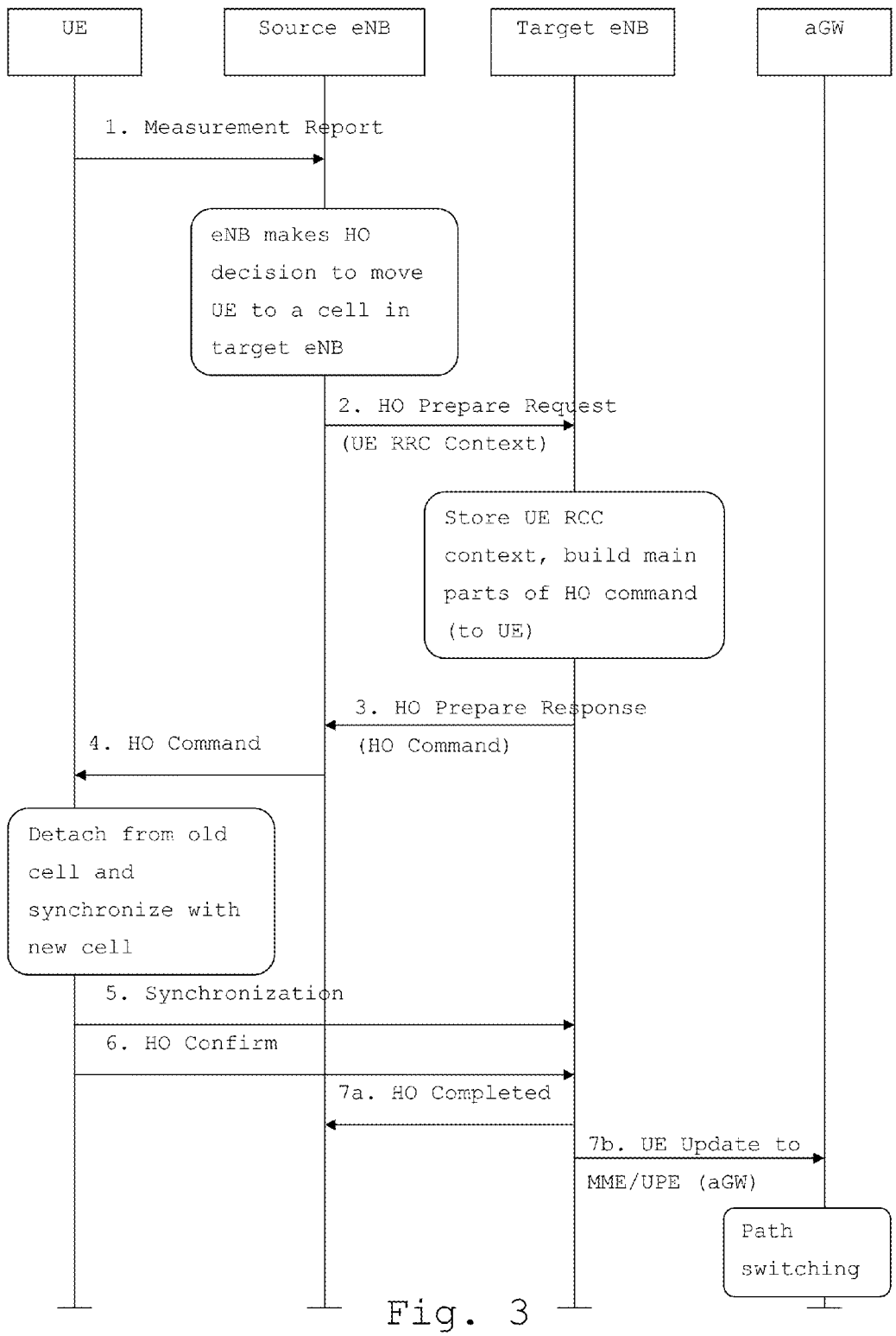
FIG. 3 shows a basic handover scenario of the background art.
Figure 4:
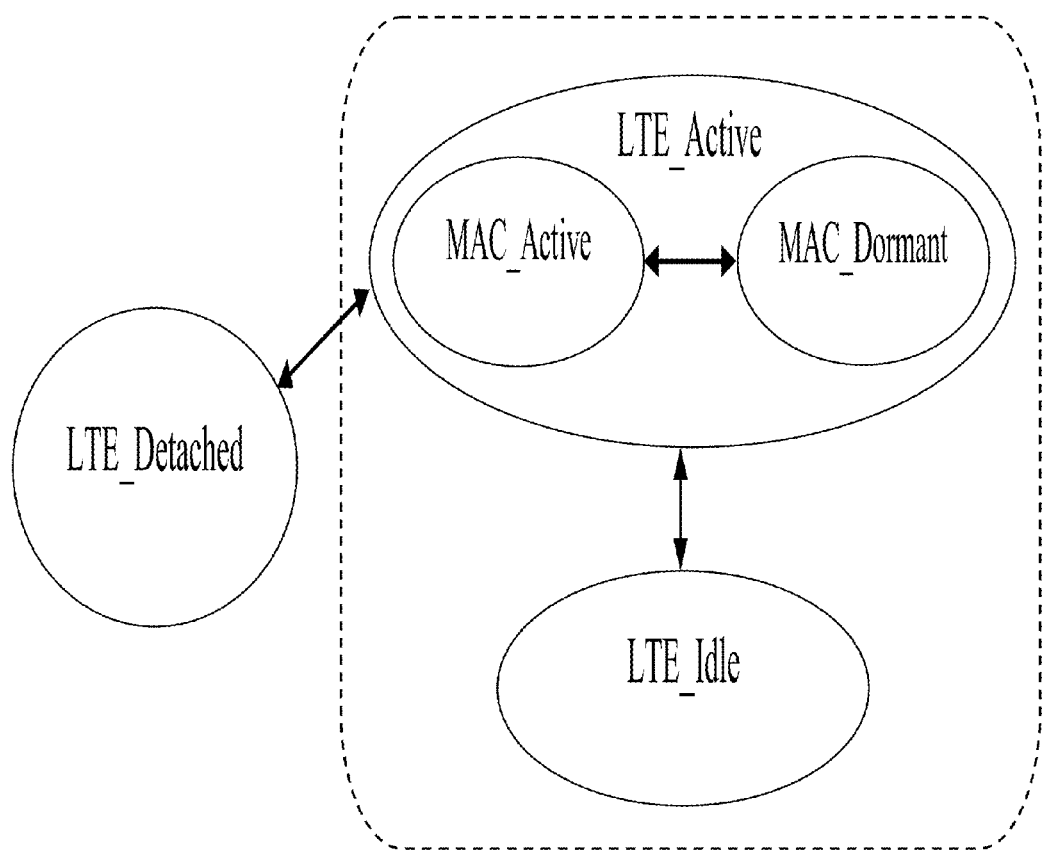
FIG. 4 shows a LTE state model.
Figure 5:
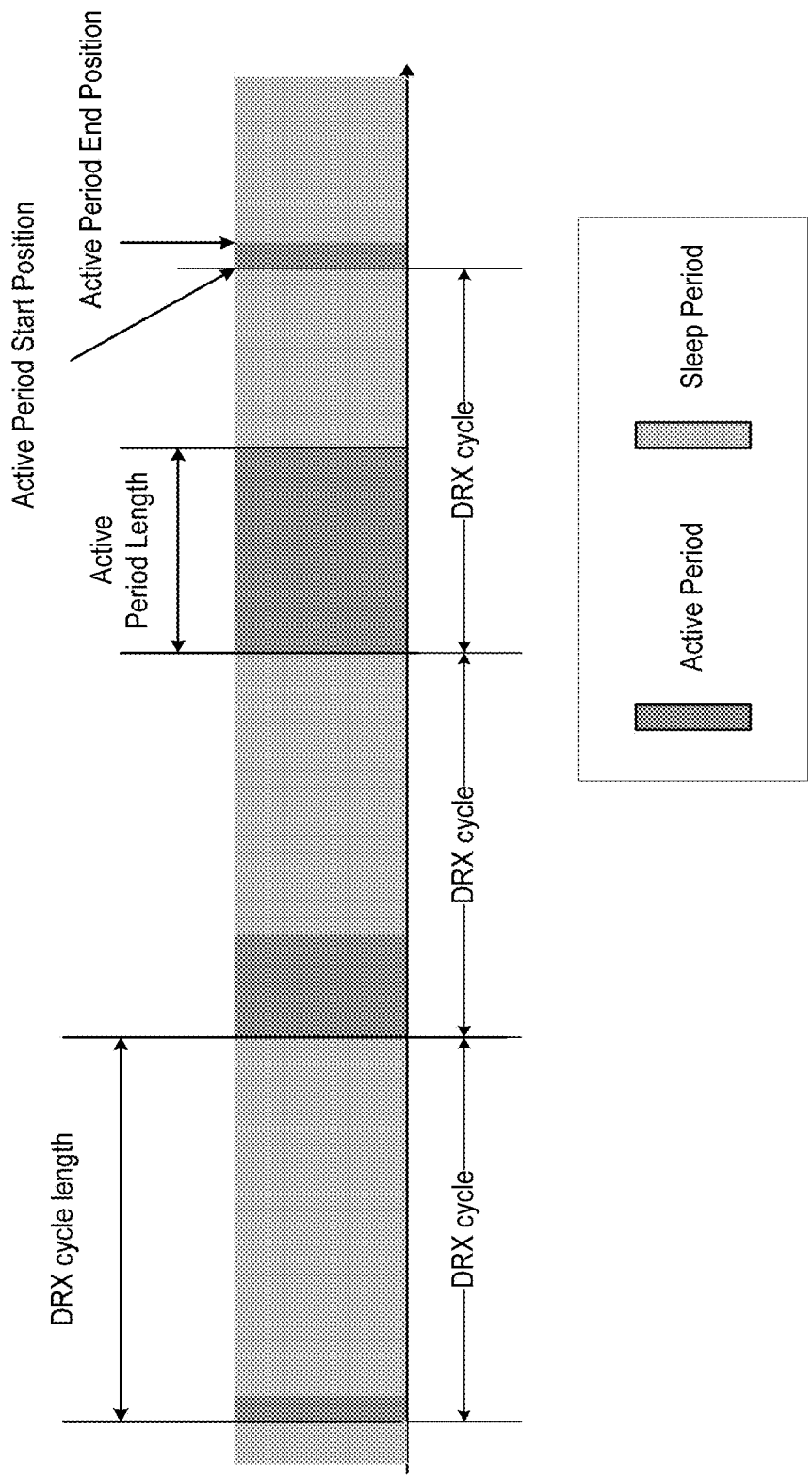
FIG. 5 shows a DRX structure.
Figure 7:
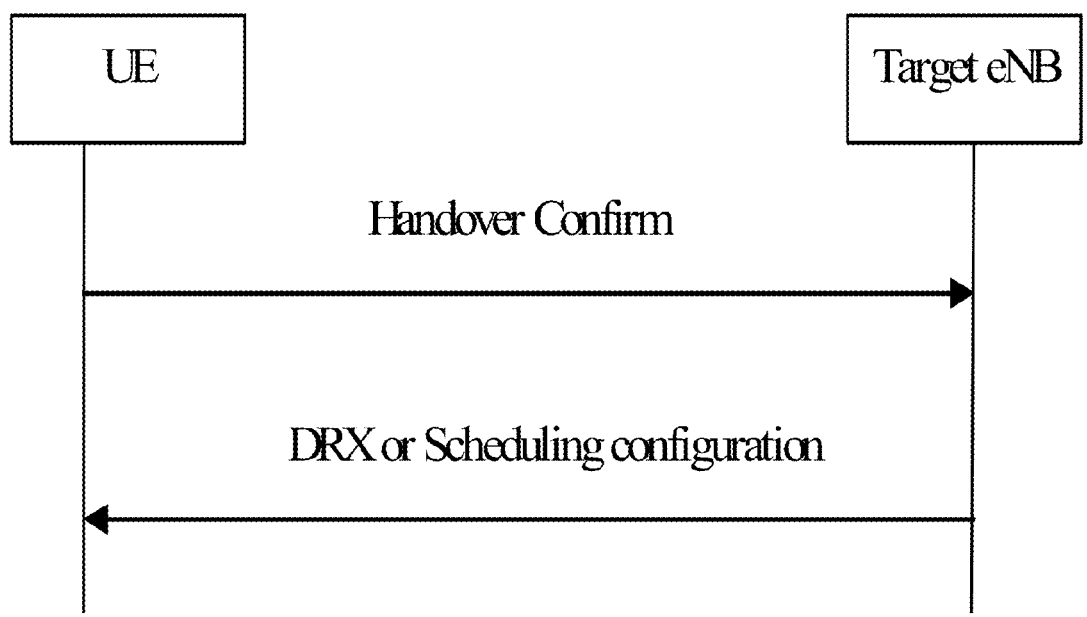
FIG. 7 shows a handover signaling scenario according to an embodiment of the present disclosure.

Signaling-wise, this information is, according to various embodiments of the present disclosure, sent to the UE in either of the following two alternatives, or a combination of those (probably, some information is sent by alternative 1, and others by alternative 2):

1. Embedded in the HO (handover) command message, which is created by the target Node B and forwarded to the UE by the source Node B. Alternative 1 is illustrated in FIG. 3.
2. Sent directly to the UE from target Node B. This message may be an RRC message, a MAC message. It may also, even though less likely, be a control message on control channel level. Alternative 2 is illustrated in FIG. 7.

A primary benefit of sending the information, or part of the information in a direct message to the UE, is that the same signaling means for DRX control and/or scheduling control may be used at handover as well as otherwise.

Further, a telecommunication system, a source cell controller node and a target cell controller node implementing the method according to the present disclosure are disclosed. The telecommunication system, the source cell controller node and the target cell controller node include means for implementing the method, i.e., means for forwarding history information, means for receiving the history information and means for estimating a traffic time pattern to be used based on the received history information. The telecommunication system, the source cell controller node and the target cell controller node may be adapted to include means for performing any of the steps of the method of the disclosure. A trivial requirement is of course that such steps do involve the telecommunication system, the source cell controller node or the target cell controller node, respectively.

The information forwarding at handover according to the disclosure may be modified by those skilled in the art, as compared to the exemplary embodiments described above.

What is claimed:

1. A controller node of a source cell, comprising at least one processor coupled with a transmitter, wherein the processor is configured to:

obtain a counting up time started from a last data transmission in any one of uplink or downlink of a mobile user equipment (UE), which is about to be handed over from the source cell to another control node of a target cell in a telecommunication system as a result of physical movement of the mobile UE, wherein the counting up time counts up time started from the last data transmission in any one of uplink or downlink of the mobile UE in the source cell until a handover preparation process is initiated; and control the transmitter to send, to the another control node of the target cell, the counting up time for radio resource management after the UE is handed over to the target cell, and configuration information for uplink scheduling request in the source cell using a handover preparation message, during the handover preparation process, wherein the uplink scheduling request is sent by the UE to request uplink resources from the source cell which is different from data communication, and wherein the configuration information for uplink scheduling request comprises:

(a) information of dedicated uplink radio resources in the source cell; and (b) a rule for when the UE is allowed to do explicit uplink scheduling requests in the source cell;

wherein the controller node of the source cell and the another controller node of the target cell are evolved Node B (eNBs) in a Long Term Evolution (LTE) system, and the counting up time is sent via an X2 interface between the eNBs.

2. The controller node according to claim 1, wherein the processor is further configured to:

control the transmitter to send, to the another control node of the target cell, a history of the mobile UE in a plurality of previous cells prior to the target cell, the history relating to behavior of the mobile UE in a timeplane.

3. The controller node according to claim 1, wherein the processor is further configured to:

control the transmitter to send, to the another control node of the target cell, information indicating a radio resource that can be used by the mobile UE for an uplink scheduling request.

4. The controller node according to claim 3, wherein the information indicating the radio resource that can be used by the mobile UE for the uplink scheduling request comprises: information indicating a dedicated code for code division multiplex access.

5. The controller node according to claim 3, wherein the information indicating the radio resource that can be used by the mobile UE for the uplink scheduling request comprises: information indicating a time and frequency resource and a dedicated code for code division multiplex access.

6. The controller node according to claim 3, wherein the information indicating the radio resource that can be used by the mobile UE for the uplink scheduling request comprises: information indicating a time and frequency resource.

7. The controller node according to claim 1, wherein the processor is further configured to:

control the transmitter to send, to the another control node of the target cell, a Discontinuous Reception (DRX) configuration used in the source cell.

8. The controller node according to claim 7, wherein the DRX configuration comprises a DRX cycle length.

9. The controller node according to claim 1, wherein the processor is further configured to:

control the transmitter to send, to the controller node of the target cell, configuration of a control channel.

10. The controller node according to claim 1, wherein the processor is further configured to:

control the transmitter to send, to the controller node of the target cell, persistent scheduling configuration.

11. A method, comprising:

obtaining, by a controller node of a source cell, a counting up time started from a last data transmission in any one of uplink or downlink of the mobile UE, the mobile UE is about to be handed over from the source cell to a target cell in a telecommunication system as a result of physical movement of the mobile UE, wherein-the counting up time counts up time started from the last data transmission in any one of uplink or downlink of the mobile UE in the source cell until a handover preparation process is initiated; and during the handover preparation process, sending, by the controller node of the source cell to a controller node of the target cell, using a handover preparation message, the counting up time for radio resource management after the UE is handed over to the target cell, and configuration information for uplink scheduling request in the source cell using a handover preparation message, wherein the uplink scheduling request is sent by the UE to request uplink resources from the source cell which is different from data communication, and wherein the configuration information for uplink scheduling request comprises:

(a) information of dedicated uplink radio resources in the source cell; and (b) a rule for when the UE is allowed to do explicit uplink scheduling requests in the source cell;

wherein the controller node of the source cell and the controller node of the target cell are evolved Node B (eNBs) in a Long Term Evolution (LTE) system, and the handover preparation message is sent via an X2 interface between the eNBs.

12. The method according to claim 11, further comprising:

sending, by the controller node of the source cell to the controller node of the target cell, a history of the mobile UE in a plurality of previous cells prior to the target cell, the history relating to behavior of the mobile UE in a timeplane.

13. The method according to claim 11, further comprising:

sending, by the controller node of the source cell to the controller node of the target cell, information indicating a radio resource that can be used by the mobile UE for an uplink scheduling request.

14. The method according to claim 13, wherein the information indicating the radio resource that can be used by the mobile UE for the uplink scheduling request comprises: information indicating a time and frequency resource, or a dedicated code for code division multiplex access, or information indicating the time and frequency resource and the dedicated code for code division multiplex access.

15. A telecommunication system, comprising a first controller node of a source cell in communication with a second controller node of a target cell, wherein the first controller node is configured to:

obtain a counting up time started from a last data transmission in any one of uplink or downlink of a mobile user equipment (UE) which is about to be handed over from the source cell to the target cell as a result of physical movement of the mobile UE, wherein the counting up time counts up time started from the last data transmission in any one of uplink or downlink of the mobile UE in the source cell until a handover preparation process is initiated; and send, to the second controller node of the target cell during the handover preparation process, the counting up time for radio resource management after the UE is handed over to the target cell, and configuration information for uplink scheduling request in the source cell using a handover preparation message, wherein the uplink scheduling request is sent by the UE to request uplink resources from the source cell which is different from data communication, and wherein the configuration information for uplink scheduling request comprises:

(a) information of dedicated uplink radio resources in the source cell; and (b) a rule for when the UE is allowed to do explicit uplink scheduling requests in the source cell;

wherein the second controller node is configured to receive the counting up time sent by the first controller node, and the first controller node and the second controller node are evolved Node B (eNBs) in a Long Term Evolution (LTE) system, and the counting up time is sent via an X2 interface between the eNBs.

16. The telecommunication system according to claim 15, wherein the first controller node is further configured to send, to the second controller node, a history of the mobile UE in a plurality of previous cells prior to the target cell, the history relating to behavior of the mobile UE in a timeplane.

17. The telecommunication system according to claim 15, wherein the first controller node is configured to: send, to the second controller node of the target cell during the handover preparation process, information indicating a radio resource that can be used by the mobile UE for an uplink scheduling request.

18. The telecommunication system according to claim 17, wherein the information indicating the radio resource that can be used by the mobile UE for the uplink scheduling request comprises: information indicating a time and frequency resource, or a dedicated code for code division multiplex access, or information indicating the time and frequency resource and the dedicated code for code division multiplex access.

* * * * *